United States Patent Office 3,372,170
Patented Mar. 5, 1968

3,372,170
SULFATION USING AMIDOSULFONIC ACID IN AN INERT SOLVENT
Hermann Remy, West Warwick, R.I., assignor to Farbwerke Hoechst Aktiengesellschaft vormals Meister Lucius & Brüning, Frankfurt am Main, Germany, a corporation of Germany
No Drawing. Filed Oct. 16, 1964, Ser. No. 404,504
Claims priority, application Germany, Oct. 29, 1963, F 41,130
3 Claims. (Cl. 260—372)

ABSTRACT OF THE DISCLOSURE

There is disclosed herein a method for the preparation of the blue acid dyestuff 1-amino-2-sulfonic acid-4-[2'-R-5'-(β - sulfato-ethylsulfonyl)anilino]anthraquinone, in which R represents hydrogen or the group —COOH, by reacting 1 - amino-2-sulfonic acid-4-[2'-R-5'-(β-hydroxyethylsulfonyl)anilino]anthraquinone with amidosulfonic acid at an elevated temperature in the presence of an inert organic solvent.

---

It is known that valuable blue acid anthraquinone dyestuffs having an excellent solubility in water can be obtained by condensing 3-aminophenyl-1β-hydroxyethylsulfone or 3-amino-4-carboxyphenyl-1β-hydroxyethylsulfone with 1-amino-4-bromanthraquinone-2-sulfonic and converting the condensation products obtained into their acid sulfuric acid esters (U.S. Patents Nos. 2,670,265 and 3,097,216).

The known processes have, however, the disadvantage of requiring for the esterification of the intermediate products containing β-hydroxyethylsulfonyl groups large excess amounts of concentrated sulfuric acid, alkali metal salts of chloro-sulfonic acid or alkali metal bisulfates. Consequently, neutralization and working-up of the reaction mixture are very complicated and large amounts of salt accumulate. Besides, the neutralization has to be effected slowly and with the utmost care, for too high local concentration of alkali or local overheating within the esterification mixture would cause splitting off of sulfuric acid with formation of the vinylsulfonyl compound or resaponification into β-hydroxy-ethylsulfone.

Now I have found that blue acid anthraquinone dyestuffs of the general formula

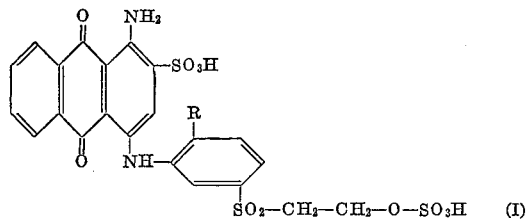

SO₂—CH₂—CH₂—O—SO₃H   (I)

in which R is a hydrogen atom or a carboxyl group, can be obtained in a very good yield and high purity by the action of amidosulfonic acid on compounds of the general formula

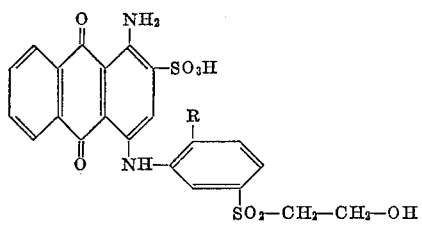

SO₂—CH₂—CH₂—OH   (II)

in which R has the meaning given above, at an elevated temperature in the presence of organic solvents.

The esterification according to the process of the invention requires only a short period of time. The solvent which is present during the reaction is removed from the reaction mixture by addition of water which has been acidified to a pH-value of 5—possibly after partial distillation at reduced pressure. The dyestuffs obtained according to the process of the invention are isolated from their aqueous solution in the usual manner by salting out. As solvents suitable for carying out the esterification there may be mentioned, for example, dimethylformamide, dimethylsulfoxide, quinoline, dimethylaniline, pyridine, picoline or lutidine as well as mixtures thereof.

The esterification is advantageously carried out at a temperature above 60° C., preferably in the range from about 75° to 100° C.

As compared to the esterification with the use of large amounts of concentrated sulfuric acid according to known processes, the process of the invention is particularly valuable in that the neutralization which may affect unfavorably the esters prepared is eliminated, since sulfuric acid is not used as esterification component.

In the presence of agents having an alkaline reaction the anthraquinone dyestuffs obtained according to the process of the invention dye fibers of vegetable origin brilliant blue shades showing excellent fastness properties to light and to wet processing.

The following examples serve to ilustrate the invention but they are not intended to limit it thereto, the parts being by weight unless otherwise mentioned and the relationship of parts by weight to parts by volume being that of the kilogram to the liter.

EXAMPLE 1

34 parts of a 90% by weight 1-amino-4-[N-(3'β-hydroxyethyl - sulfonyl) - phenyl]-amino-anthraquinone-2-sulfonic acid are introduced into 150 parts by volume of pyridine and the mixture is heated to 75–80° C. Then 21 parts of amidosulfonic acid are added. Within a few minutes the temperature of the reaction mixture rises to 95–100° C. and, after the evolution of heat has decayed, is kept at this height for 30 minutes by external heating. The esterification mixture is then poured into 1500 parts by volume of water which has been acidified to a pH-value of 5 by means of hydrochloric acid. By addition of potassium chloride the ester is then salted out from its aqueous solution at 60–65° C., filtered, washed with an 8% potassium chloride solution and dried.

The dyestuff prepared according to the process of the invention corresponds to the following formula

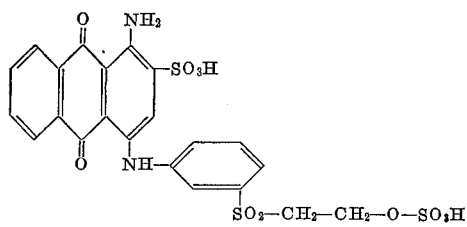

SO₂—CH₂—CH₂—O—SO₃H and is obtained in a very pure state and in a yield of 33.5 parts, corresponding to 94% of the theoretical yield. The dyestuff is identical with that which is isolated by esterification of the corresponding β-hydroxyethylsulfonyl compounds with concentrated sulfuric acid, according to the process described in U.S. Patent No. 2,670,265.

Instead of pyridine it is also possible to use other solvents, such as quinoline, dimethylaniline, dimethylformamide, dimethylsulfoxide, picoline or lutidine or mixtures thereof.

EXAMPLE 2

37 parts of a 90% by weight 1-amino-4-[N-(2'-carboxy - 5'β - hydroxyethylsulfonyl)-phenyl]-aminoanthraquinone-2-sulfonic acid are introduced into 150 parts by volume of pyridine and the mixture is heated to 75–80° C. After addition of 21 parts of amidosulfonic acid the preparation is continued in the manner described in Example 1.

36 parts of the dyestuff of the following formula

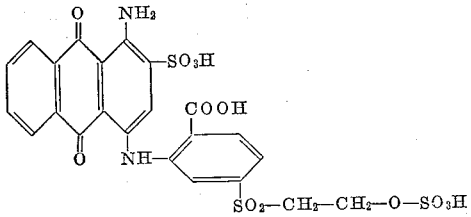

are obtained, corresponding to 94% of the theoretical yield. The dyestuff which is obtained in a very pure state is identical with that which is isolated by esterification of the corresponding β-hydroxyethylsulfonyl compound with sulfuric acid, according to the process described in U.S. Patent No. 3,097,216.

The reaction may be carried out in analogous manner with the solvents specified in Example 1.

I claim:
1. A process for preparing blue acid anthraquinone dyestuffs of the formula

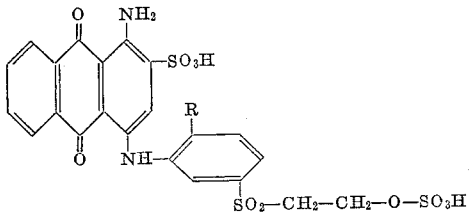

wherein R represents a member selected from the group consisting of hydrogen and —COOH, which comprises esterifying a compound of the formula

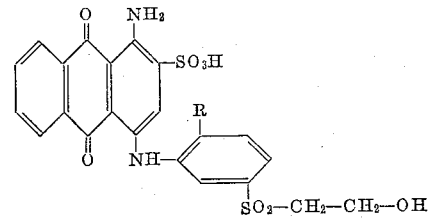

in which R is defined as above, at an elevated temperature with amidosulfonic acid in the presence of an inert organic solvent.

2. A process as claimed in claim 1, wherein the esterification is carried out at a temperature within the range of about 75° C. to about 100° C.

3. A process as claimed in claim 1, wherein a member selected from the group consisting of dimethylformamide, dimethylsulfoxide, quinoline, dimethylaniline, pyridine, picoline and lutidine and mixtures thereof is used as inert organic solvent.

References Cited

UNITED STATES PATENTS

| | | |
|---|---|---|
| 2,758,977 | 8/1956 | Knowles et al. |
| 3,265,722 | 8/1966 | Dudley _____ 260—458 |

OTHER REFERENCES

Gore, Chemistry of Natural and Synthetic Coloring Matters, New York, Academic Press, Inc. (1962), pp. 481–482.

LORRAINE A. WEINBERGER, *Primary Examiner.*

H. C. WEGNER, *Assistant Examiner.*